(12) United States Patent
Williams

(10) Patent No.: US 10,385,775 B2
(45) Date of Patent: Aug. 20, 2019

(54) COMBUSTION ENGINE

(71) Applicant: Gabrielle Engine Limited, Minera, Wrexham (GB)

(72) Inventor: Clive Propert Williams, Wrexham (GB)

(73) Assignee: GABRIELLE ENGINE LIMITED, Minera, Wrexham (GB)

( * ) Notice: Subject to any disclaimer, the term of this patent is extended or adjusted under 35 U.S.C. 154(b) by 261 days.

(21) Appl. No.: 15/308,555

(22) PCT Filed: Apr. 30, 2015

(86) PCT No.: PCT/GB2015/051254
§ 371 (c)(1),
(2) Date: Nov. 2, 2016

(87) PCT Pub. No.: WO2015/181519
PCT Pub. Date: Dec. 3, 2015

(65) Prior Publication Data
US 2017/0058767 A1    Mar. 2, 2017

(30) Foreign Application Priority Data

May 28, 2014 (GB) .................... 1409480.9

(51) Int. Cl.
*F02C 3/14* (2006.01)
*F02C 3/16* (2006.01)
(Continued)

(52) U.S. Cl.
CPC ............... *F02C 3/14* (2013.01); *F02C 3/165* (2013.01); *F02C 7/06* (2013.01); *F02C 7/22* (2013.01);
(Continued)

(58) Field of Classification Search
CPC .... F02C 3/14; F02C 3/16; F02C 3/165; F02C 7/06; F02C 7/22; F02C 5/02; F02C 5/12;
(Continued)

(56) References Cited

U.S. PATENT DOCUMENTS 1,210,831 A    1/1917 Pfeiffer
3,005,311 A   10/1961 Ross
(Continued)

FOREIGN PATENT DOCUMENTS

DE    3445105 A1    6/1986
FR     527388 A    10/1921
(Continued)

OTHER PUBLICATIONS

International Search Report, PCT/GB2015/051254. dated Aug. 11, 2015. European Patent Office, Rijswijk, NL.
(Continued)

*Primary Examiner* — Steven M Sutherland
*Assistant Examiner* — Jacek Lisowski
(74) *Attorney, Agent, or Firm* — Coats & Bennett, PLLC

(57) ABSTRACT

A combustion engine comprising a radial compressor in flow communication via a flow passage with an annular compressor-combustor array radially outward of the radial compressor. Both the radial compressor and compressor-combustor are co-axial with, and rotatable around, a central axis.

18 Claims, 2 Drawing Sheets

(51) Int. Cl.
  *F02C 7/06* (2006.01)
  *F02C 7/22* (2006.01)
  *F04D 29/28* (2006.01)

(52) U.S. Cl.
  CPC ........ *F04D 29/284* (2013.01); *F05D 2240/35* (2013.01)

(58) Field of Classification Search
  CPC .. F02C 3/05; F02C 3/08; F04D 29/284; F04D 29/286; F05D 2240/35; F01D 5/043; F01D 5/045
  See application file for complete search history.

(56) References Cited

U.S. PATENT DOCUMENTS

| | | | |
|---|---|---|---|
| 3,321,911 A | 5/1967 | Myles | |
| 3,937,009 A | 2/1976 | Coleman | |
| 7,062,900 B1* | 6/2006 | Brun | F01D 1/06 60/39.35 |

FOREIGN PATENT DOCUMENTS

| | | | |
|---|---|---|---|
| FR | 934755 A | 6/1948 | |
| GB | 616786 A | 1/1949 | |
| WO | 02059469 A1 | 8/2002 | |
| WO | 2012005619 A1 | 1/2012 | |

OTHER PUBLICATIONS

Patents Act 1977: Search Report under Section 17. Application No. GB1409480.9. dated Dec. 10, 2014. Intellectual Property Office, Newport, South Wales.

* cited by examiner

COMBUSTION ENGINE

The present disclosure relates to a combustion engine.

BACKGROUND

Internal combustion engines, and in particular gas turbine engines, are well known and can take many different forms.

Gas turbine engines comprise a flow path defined by a compressor, combustor and a turbine. Gas accelerated by a combustion process passes through the turbine, and the turbine powers the compressor via a shaft, and hence the compressor is rotated to deliver a flow of air to the combustor and thus perpetuate a combustion cycle.

The number of components, including housings and ancillary equipment, mean that the resultant construction is complex and heavy.

Hence a combustion engine which is capable of producing thrust for propulsion or driving a turbine, which comprises fewer parts, and in particular fewer rotatable parts, is highly desirable.

SUMMARY

According to the present invention there is provided an apparatus as set forth in the appended claims. Other features of the invention will be apparent from the dependent claims, and the description which follows.

Accordingly there may be provided a combustion engine comprising: a radial compressor in flow communication via a flow passage with an annular compressor-combustor array radially outward of the radial compressor; both the radial compressor and compressor-combustor being co-axial with, and rotatable around, a central axis.

The flow passage may be provided between the radial compressor and the compressor-combustor comprises an array of flow turning vanes.

The compressor-combustor may comprise an array of rotor blades, wherein the walls of the blades define a plurality of chambers, each chamber having a flow inlet to receive fluid from the radial compressor, and a flow outlet to exhaust fluid radially outwards from the compressor-combustor; at least one of the chambers being configured as a pilot combustion zone, and at least one of the chambers being provided as a compression flow path.

The pilot combustion chambers may be provided between compression chambers.

The walls of the or each compression chamber may converge between its flow inlet and its flow outlet such that the flow inlet has a greater effective flow area than its flow outlet.

The walls of the or each pilot combustion chamber may diverge between its flow inlet and its flow outlet such that the flow inlet has a smaller effective flow area than its flow outlet.

The pilot combustion chambers may be provided with a fuel injector towards their inlet end.

The fuel injector may extend from one wall of the pilot combustion chamber at least part way across the chamber to an opposing wall.

The fuel injector may comprise a hollow tube with at least one aperture to deliver fuel from inside the tube to the pilot combustion zone.

A housing may be provided around the compressor-combustor, passages being provided in walls of the housing for the delivery of fluid from a source of compressed fluid to a clearance gap provided between the compressor-combustor and the housing, operable to provide an air bearing.

The radial compressor and the compressor-combustor may be rotatably mounted such that they are rotatable relative to one another.

The radial compressor may be mechanically linked by a gearing mechanism to the compressor-combustor such that the radial compressor is driveable by rotation of the compressor-combustor.

The radial compressor may be carried on a shaft, the shaft being centred on, and coaxial with, the central axis.

The shaft may be non rotatable, and the radial compressor may be rotatably supported on the shaft by a bearing.

The radial compressor may comprise a fluid inlet towards its rotational axis.

A main combustion chamber may be provided radially outwards of the compressor-combustor, and may be in flow communication with the or each compressor-combustor chambers.

The main combustion chamber may have an outlet, the outlet being in flow communication with an exhaust duct.

The main combustor may define a flow path at an angle to the radial flow direction defined by the radial compressor and compressor-combustor.

The main combustor may define a flow path perpendicular to the radial flow direction defined by the radial compressor and compressor-combustor.

The main combustor may comprise vanes which define a flow path between the exit of the compressor-combustor to the exhaust duct.

Thus there is provided a combustion engine of relatively simple design and relatively few moving parts, which is hence easier and cheaper to manufacture than a conventional turbo machine, and also inherently more robust and overall volumetrically smaller than turbo machinery having equivalent power outputs.

BRIEF DESCRIPTION OF THE DRAWINGS

Examples of the present disclosure will now be described with reference to the accompanying drawings, in which.

DETAILED DESCRIPTION

Figure 1:
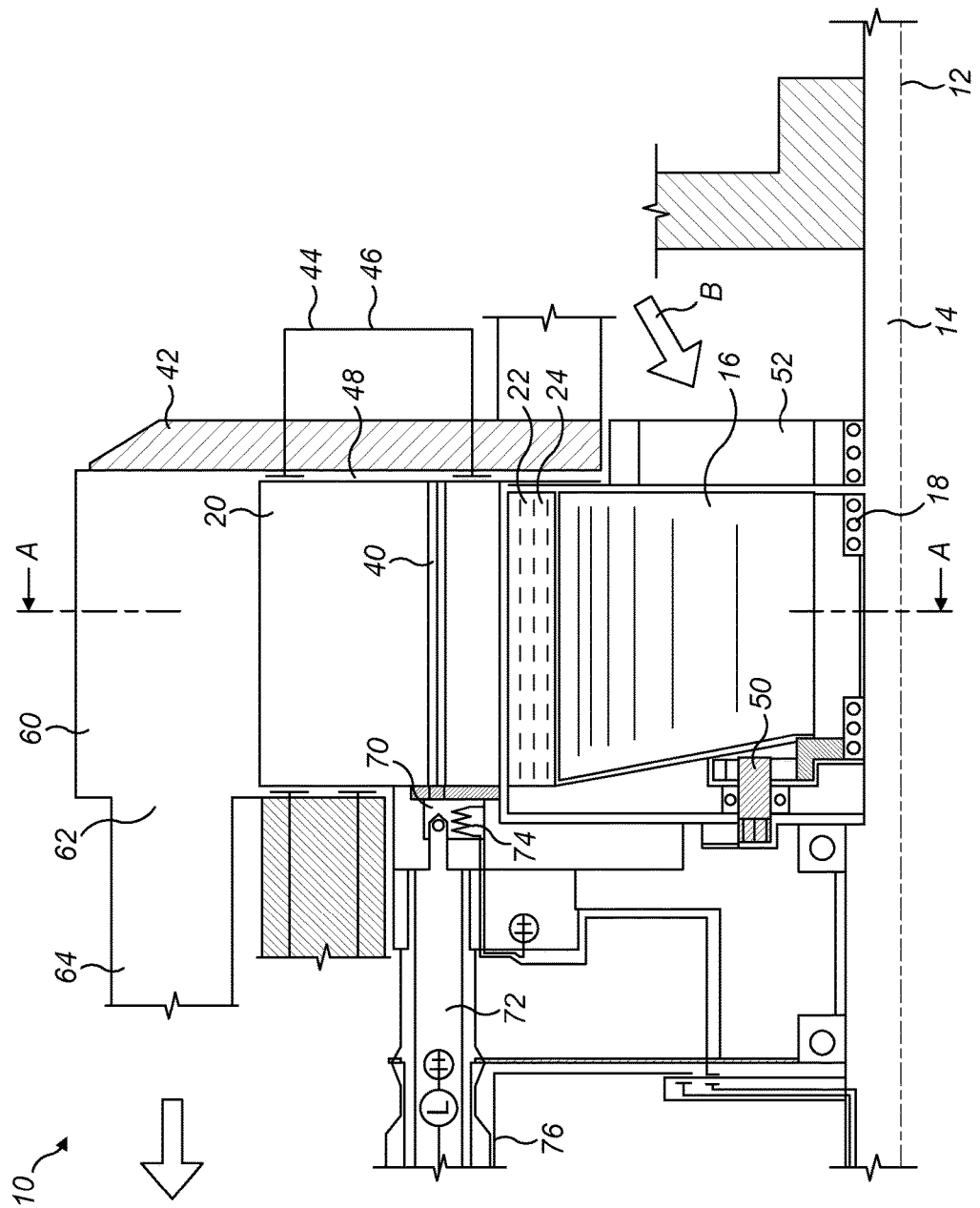
FIG. 1 shows a cross-sectional view of the combustion engine according to the present disclosure.
Figure 2:
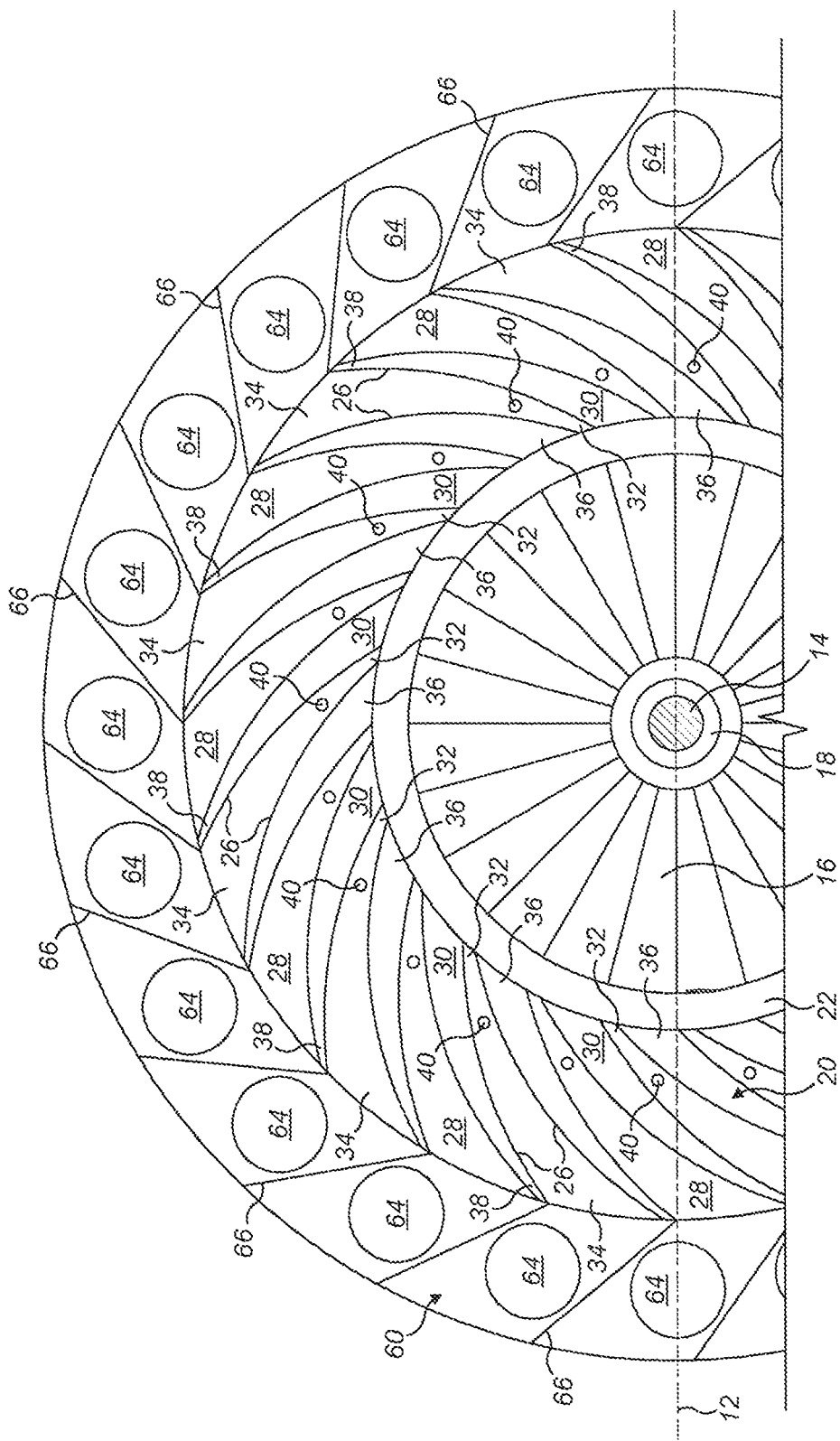
FIG. 2 shows a cross-sectional view through line A-A in FIG. 1.

FIG. 1 shows a cross-sectional view of a combustion engine 10 according to the present disclosure. FIG. 2 shows a cross-sectional view through line A-A shown in FIG. 1. The device is presented schematically, and it will be appreciated that technical details have been omitted for the sake of clarity, or where such are well known in the art.

The features shown in FIGS. 1 and 2 are symmetrical about a central rotational axis 12. A non-rotatable (i.e. fixed) shaft 14 is centered on, and hence co-axial with, the central axis 12. The shaft 14 carries a radial compressor 16. The radial (or "first stage") compressor 16 is rotatably supported on the shaft 14 by a bearing means 18.

It will be appreciated the term "radial compressor" may have a specific meaning in the art. In the present disclosure the term "radial compressor" is intended to encompass any compressor which compresses a fluid as the fluid is directed outwards from a central rotational axis. Fluid may be a liquid or gas, or mixture of both.

The bearing means 18 may comprise rollers, balls or may be provided as a magnetic bearing.

An annular compressor-combustor 20 is provided radially outward of the radial compressor 16. The compressor-combustor 20 may be provided directly radially outwards of the radial compressor 16 (as shown in the figures). Alternatively, the compressor-combustor 20 may be provided radially outwards and axially offset from the radial compressor 16.

The compressor-combustor array 20 is coaxial with, and rotatable around, the shaft 14, and hence the central axis 12. The radial compressor 16 is in flow communication with the compressor-combustor array 20 via a flow passage 22.

As shown in FIG. 1 (but omitted from FIG. 2 for clarity) the flow passage 22 comprises an array of flow turning vanes 24. Alternatively, no flow turning vanes are provided in the flow passage 22. Alternatively, vanes are provided to direct, but not turn, fluid passing through the flow passage 22.

The compressor-combustor array 20 comprises an array of rotor blades 26. The walls of the rotor blades 26 define a plurality of chambers 28, 30. Some of the chambers are configured as pilot combustion zone chambers 28, and the other chambers are configured and provided as ("second stage") compression flow path chambers 30. Each pilot combustion zone chamber 28 has a flow inlet 32 configured to receive fluid from the inner compressor 16, and a flow outlet 34 to exhaust fluid, which is on the radially outward side of the pilot combustion zone chamber 28. Each of the compression chambers 30 have a flow inlet 36 to receive fluid from the inner compressor 16, and a flow outlet 38 to exhaust fluid radially outwards from the compression chamber 30. That is to say, each chamber 28, 30 has a flow inlet to receive fluid from the inner compressor 16, and a flow outlet to exhaust fluid radially outwards from the compressor-combustor 20.

The pilot combustion zone chambers 28 are provided between the compression chambers 30. That is to say, moving around the circumference of the compressor-combustor array 20, the pilot combustion zone chambers 28 and compression chambers 30 are provided alternatively around the array, such that each pilot combustion zone chamber 28 is flanked on either side by a compression chamber 30, and each compression chamber 30 is flanked on both sides by a pilot combustion zone chamber 28. Put another way, each pilot combustion zone chamber 28 is spaced apart from the next pilot combustion zone chamber 28 by a compression chamber 30. Likewise each compression chamber 30 is spaced apart from the next compression chamber 30 by a pilot combustion zone chamber 28.

Alternatively, there may be provided a different pattern of pilot combustion zone chambers 28 and compression chambers 30 which are spaced and alternated in a different pattern to that described above. Essentially however, there should be provided a number of pilot combustion zone chambers 28 around the circumference of the compressor-combustor array 20 in addition to a number of fluid flow passages between them. The flow paths may be provided as compression chambers 30 as described above and shown in the Figures. Alternatively the flow paths between pilot combustion zone chambers 28 may be configured to provide fluid flow expansion. Alternatively the flow paths between pilot combustion zone chambers 28 may provide a flow path only, i.e. without significant compression or expansion between the inner compressor 16 and the outlet from the compressor-combustor 20.

As well as providing a source of fluid for complete combustion (discussed later) the flow through the compression chambers 30 also acts to cool the rotor blades 26 by removing heat absorbed by the rotor blades 26 as a result of the combustion in the pilot combustion zone chambers 28.

The walls of one or each of the compression chambers 30 may converge between the flow inlet 36 and the flow outlet 38. That is to say, the flow inlet 36 to the compression chamber 30 has a greater effective flow area than the corresponding flow outlet 38.

In alternative examples, the walls of one or each of the chambers 30 may diverge or be substantially parallel between the flow inlet 36 and the flow outlet 38, in which case they provide flow passages rather than compression flow paths.

The walls of the or each pilot combustion zone chamber 28 may diverge between its flow inlet 32 and its flow outlet 34, such that the flow inlet 32 has a smaller effective flow area than it's flow outlet 34.

The pilot combustion zone chambers 28 are provided with a fuel injector 40. In the example shown, the fuel injector 40 is provided towards the inlet end 32 of the pilot combustion zone chamber 28. The fuel injector 40 extends from one wall of the pilot combustion zone chamber 28 at least part way across to an opposing wall of the pilot combustion zone chamber 28. In the example shown, the fuel injector 40 extends all of the way from one wall of the pilot combustion zone chamber 28 to an opposing wall of the pilot combustion zone chamber 28. In the example shown, the fuel injector 40 comprises a hollow tube with at least one aperture located at a position spaced apart from the wall of the pilot combustion zone chambers 28 to deliver fuel from inside the tube to the pilot combustion zone chamber 28.

The fuel injector 40 opens at one end into a fluid reservoir 70 adjacent a wall of the housing 42. In the example shown, a fuel delivery conduit 72 delivers fuel to the fluid reservoir 70. A glow plug 74 is provided in the fluid reservoir 70 to pre heat fuel in the fluid reservoir 70 prior to being delivered to the fuel injector 40. Fuel lines 76 are configured to receive fuel from a fuel source (not shown), and are in flow communication with the fuel delivery conduit 72. The fuel delivery conduit 72 is rotatable with the compressor-combustor 20.

Any suitable fuel delivery arrangement may be provided instead.

A housing 42 is provided around the compressor-combustor 20 with passages 44 being provided in walls of the housing 42 for the delivery of fluid from a source 46 of compressed fluid to a clearance gap 48 provided between the compressor-combustor 20 and the housing 42, to thereby provide an air bearing. Provision of an air bearing is only one possible solution to support, alignment and cooling needs of a device of the present disclosure, and any suitable bearing and cooling means may be provided as an alternative.

The radial compressor 16 and the compressor-combustor 20 are rotatably mounted such that they are rotatable relative to one another. That is to say, the radial compressor 16 and the compressor-combustor 20 may rotate at different speeds to one another around the central axis 12. The radial compressor 16 and the compressor-combustor 20 may additionally, or alternatively, rotate in different directions to one another around the central axis 12. The radial compressor 16 is mechanically linked via a gearing mechanism 50 to the compressor-combustor array 20 such that rotation of the compressor-combustor 20 drives the radial compressor 16.

The radially inner compressor 16 comprises a fluid inlet 52 towards its radially inner end. Upstream of this is a flow path to provide a source of fluid (i.e. air) to the compressor 16.

A main combustion chamber 60 is provided radially outwards of the compressor-combustor array 20 and is in fluid communication, that is to say flow communication, with one or each of the pilot combustion zone chambers 28. That is to say, the flow outlet 34 from the pilot combustion zone chambers 28 exhaust directly into the main combustor 60. The main combustion chamber 60 has an outlet 62, the outlet 62 being in flow communication with an exhaust duct 64. The main combustor 60 defines a flow path at an angle to the radial flow direction defined by the radial compressor 16 and compressor-combustor 20.

The main combustor 60 defines a flow path substantially perpendicular to the radial flow direction defined by the inner compressor 16 and the compressor-combustor 20.

The main combustor 60 may comprise vanes 66 which define a flow path between the exit of the compressor-combustor 20 to the exhaust duct 64, as shown in FIG. 2. The exhaust duct 64 may comprise a series of ducts arranged around the circumference of the main combustor chamber 60, each duct 64 being provided as a circular tube which extends away from the combustion chamber 60. The vanes 66 may be shaped and configured such that they direct gas travelling from the exit from the compressor-combustor 20 to each of the exhaust ducts 64. That is to say, the vanes 66 define flow paths which lead to the entrance to the exhaust duct 64.

In operation, a starter motor or such like (not shown) will rotate the radial compressor 16, and hence the compressor-combustor 20, to thereby draw air into the inlet 52 in the direction shown by arrow "B" in FIG. 1. The radial compressor 16 compresses the air as it flows radially outwards to the flow turning vanes 24 (where present) where the air is turned to have a favourable angle of incidence for entry into the compression chambers 30 and the pilot combustion zone chambers 28.

Air entering compression chambers 30 is compressed by the action of rotation of the compressor-combustor array 20. That is to say, as the air in the compression chambers 30, it is compressed and forced to move radially outwards and is delivered to the outlets 38 and then to the main combustor 60.

In examples where the flow path chambers have substantially parallel or diverging walls, the air in the combustion chambers 30 is merely forced to move radially outwards with little or no rise in pressure before being delivered to the outlets 38 and then to the main combustor 60.

At the same time air is passed into the inlet 32 of the pilot combustion zone chambers 28, and fuel is added from the fuel injector 40.

The fuel air mix is initially ignited by an igniter, perhaps of conventional design located in the pilot combustion zone chamber 28 or main combustor 60. After initial ignition, the combustion in the pilot combustion zone chamber 28 and main combustor 60 is self-perpetuating.

Air flowing along the flow paths will cool the walls of the compression chambers 28 and mix with the unburned and burning fuel entering the main combustor to complete the combustion process. The compressor-combustor array 20 is propelled around the shaft 14 in response to the expanded and accelerated gas exiting the pilot combustion zone chambers 28. That is to say, the gas leaving the pilot combustion zone chamber 28 has been sufficiently expanded and accelerated by the combustion process to impart a thrust upon the rotor blades 26 and thus turn the compressor-combustor 20 around the central axis 12. As the compressor-combustor 20 is in a geared relationship with the compressor 16, the rotation of the compressor-combustor 20 will rotate the compressor 16. Hence the compressor 16 is powered to draw in fluid through the inlet 52 in the direction shown by arrow B in FIG. 1, and the air being drawn in will be compressed, and the cycle of compression and combustion will be repeated and perpetuated.

Fuel combustion, i.e. complete combustion, will occur in the main combustor 60. Hence the fuel and air will be accelerated further as they expand and exit from the main combustor 62 through the duct(s) 64. This may be used to provide thrust, or to drive a turbine to provide a power off-take as required.

Hence there is provided a combustion engine capable of producing sufficient thrust and/or power output to power a land, water or air vehicle. The configuration of the device of the present disclosure lends itself to being provided at a lower cost, and to fit within a smaller volume, than an equivalent conventional combustion engine. The absence of a separate turbine, which is normally common in a gas turbine engine, allows for a more compact design, with fewer moving parts.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A combustion engine comprising: a radial compressor in flow communication via a flow passage with a compressor-combustor array radially outward of the radial compressor;
    both the radial compressor and the compressor-combustor array being co-axial with, and rotatable around, a central axis,
    wherein the compressor-combustor array comprises an array of rotor blades,
    wherein walls of the array of rotor blades define a plurality of chambers, each of the plurality of chambers having a flow inlet to receive fluid from the radial compressor,
    and a flow outlet to exhaust fluid radially outwards from the compressor-combustor array;

the plurality of chambers comprising pilot combustion zone chambers and compression chambers;

the pilot combustion zone chambers are provided between the compression chambers.

2. The combustion engine as claimed in claim 1 wherein the flow passage provided between the radial compressor and the compressor-combustor array comprises an array of flow turning vanes.

3. The combustion engine as claimed in claim 1 in which walls of the compression chambers converge between the flow inlet and the flow outlet such that the flow inlet has a greater effective flow area than the flow outlet.

4. The combustion engine as claimed in claim 1 in which walls of the pilot combustion zone chambers diverge between the flow inlet and the flow outlet such that the flow inlet has a smaller effective flow area than the flow outlet.

5. The combustion engine as claimed in claim 1 wherein each of the pilot combustion zone chambers are provided with a fuel injector towards an inlet end.

6. The combustion engine as claimed in claim 5 wherein the fuel injector extends from one wall of the pilot combustion zone chamber at least part way across the pilot combustion zone chamber to an opposing wall.

7. The combustion engine as claimed in claim 5 wherein the fuel injector comprises a hollow tube with at least one aperture to deliver fuel from inside the hollow tube to the pilot combustion zone chamber.

8. The combustion engine as claimed in claim 1 wherein a housing is provided around the compressor-combustor array, second passages being provided in walls of the housing for delivery of fluid from a source of compressed fluid to a clearance gap provided between the compressor-combustor array and the housing, operable to provide an air bearing.

9. The combustion engine as claimed in claim 1 wherein the radial compressor and the compressor-combustor array are rotatably mounted such that they are rotatable relative to one another.

10. The combustion engine as claimed in claim 9 wherein the radial compressor is mechanically linked by a gearing mechanism to the compressor-combustor array such that the radial compressor is driveable by rotation of the compressor-combustor array.

11. The combustion engine as claimed in claim 1 wherein the radial compressor is carried on a shaft, the shaft being centered on, and coaxial with, the central axis.

12. The combustion engine as claimed in claim 11 wherein the shaft is non rotatable, and the radial compressor is rotatably supported on the shaft by a bearing.

13. The combustion engine as claimed in claim 1 wherein the radial compressor comprises a fluid inlet towards a rotational axis.

14. The combustion engine as claimed in claim 1 wherein a main combustion chamber is provided radially outwards of the compressor-combustor array, and is in flow communication with each of the pilot combustion zone chambers and compression chambers.

15. The combustion engine as claimed in claim 14 wherein the main combustion chamber has a different outlet, the different outlet being in flow communication with an exhaust duet.

16. The combustion engine as claimed in claim 14 wherein the main combustion chamber defines a flow path at an angle to a radial flow direction defined by the radial compressor and the compressor-combustor array.

17. The combustion engine as claimed in claim 14 wherein the main combustion chamber com buster defines a flow path perpendicular to a radial flow direction defined by the radial compressor and the compressor-combustor array.

18. The combustion engine as claimed in claim 14 wherein the main combustion chamber comprises vanes which define a flow path between an exit of the compressor-combustor array and an exhaust duct.

* * * * *